United States Patent
Amatucci et al.

(10) Patent No.: US 6,187,061 B1
(45) Date of Patent: Feb. 13, 2001

(54) SUPERCAPACITOR STRUCTURE AND METHOD OF MAKING SAME

(75) Inventors: Glenn G. Amatucci, East Brunswick, NJ (US); Aurelien DuPasquier; Jean-Marie Tarascon, both of Amiens (FR)

(73) Assignee: Telcordia Technologies, Inc., Morristown, NJ (US)

( * ) Notice: Under 35 U.S.C. 154(b), the term of this patent shall be extended for 0 days.

(21) Appl. No.: 09/315,434

(22) Filed: May 20, 1999

Related U.S. Application Data

(62) Division of application No. 09/159,557, filed on Sep. 24, 1998.

(51) Int. Cl.[7] .................................................. H01G 9/00
(52) U.S. Cl. ......................... 29/25.03; 361/502; 361/503
(58) Field of Search ................................. 361/500, 502, 361/503, 504, 508, 516, 522, 524, 541; 429/192, 208, 170; 29/25.03

(56) References Cited

U.S. PATENT DOCUMENTS

| | | | |
|---|---|---|---|
| 5,245,512 | * | 9/1993 | Rounds ................................. 361/504 |
| 5,284,723 | * | 2/1994 | Hannecart et al. ................... 428/213 |
| 5,571,634 | * | 11/1996 | Gozdz et al. ......................... 429/309 |
| 5,635,138 | * | 6/1997 | Amatucci et al. .................... 422/104 |
| 5,690,901 | * | 11/1997 | Zhang et al. ....................... 423/449.6 |
| 5,705,259 | * | 1/1998 | Mrotek et al. ....................... 428/209 |
| 5,728,181 | * | 3/1998 | Jung et al. .......................... 29/623.5 |
| 5,776,637 | * | 7/1998 | Kashido et al. ..................... 429/217 |
| 5,811,205 | * | 9/1998 | Andrieu et al. ...................... 429/137 |

* cited by examiner

*Primary Examiner*—Kristine Kincaid
*Assistant Examiner*—Eric W. Thomas
(74) *Attorney, Agent, or Firm*—David A. Hey

(57) ABSTRACT

Supercapacitor cell electrode and separator elements formulated as membranes of plasticized polymers matrix compositions are laminated with electrically conductive current collector elements to form flexible, unitary supercapacitor structures. The matrix plasticizer component is extracted from the laminate with polymer-inert solvent and replaced with electrolyte solution to activate the supercapacitor. Various arrangements of cell structure elements provide parallel and series cell structures which yield improved specific energy capacity and increased voltage output for utilization demands. The supercapacitor elements may also be laminated with similar polymeric rechargeable battery cell structures to provide hybrid devices capable of delivering both high energy and high power as needed in electronic systems.

3 Claims, 5 Drawing Sheets

SUPERCAPACITOR STRUCTURE AND METHOD OF MAKING SAME

CROSS REFERENCE TO RELATED APPLICATIONS

This application is a divisional application of U.S. patent application Ser. No. 09/159,557, filed Sep. 24, 1998, now pending.

BACKGROUND OF THE INVENTION

The present invention relates to capacitors which are capable of exhibiting high energy capacitance and high current density discharge over relatively extended time periods ranging from a few seconds to minutes. Such "supercapacitors" are particularly useful for delivering high levels of electrical current to utilization devices in a much shorter time than required by battery systems alone. The invention is directed in particular to a supercapacitor structure, and method of making the same, which incorporates the basic capacitor elements into a unitary, flexible structure which may be sized and shaped as desired to be most compatible with utilization devices while providing advantageously high energy capacities and current densities. The invention further takes advantage of available polymeric rechargeable battery technology in order to provide hybrid supercapacitor systems which are capable of retaining the power and dimensioning versatility of the novel supercapacitor structures.

In large measure, available supercapacitors are of the double layer type in which a pair of electrodes, typically comprising particulate activated carbon, are separated by a microporous, electron-insulating, ion-conducting sheet element comprising a uniformly-dispersed electrolyte component. The structure of the typical supercapacitor further comprises electrically-conductive current collector elements in intimate contact with the respective electrodes. Common among the structural variants of such prior supercapacitor devices are means, such as compressive arrangements, which maintain the essential close physical contact between elements in order to ensure low internal electrical resistance. An example of a capacitor of this type may be seen in U.S. Pat. No. 3,536,936 where the considerable compacting pressure required to reduce to usable levels the internal electrical resistance of the carbon particle electrode composition, as well as of the electrode/collector interface, creates severe difficulties in the fabrication of the capacitor cell.

Attempts have been made to reduce the internal electrical resistance in supercapacitor electrodes by means other than directly-applied physical pressure, notably through some manner of unifying the particulate carbon electrode composition and conductive collectors. A process of high-temperature sintering of the elements to achieve this end is described in U.S. Pat. No. 5,115,378, yet, as is apparent there, the extensive processing steps and high energy consumption lead to economic undesirability of this approach. Further limiting the general acceptance of the process is the intractability of the resulting solid and unyielding preformed capacitor body which cannot be readily shaped to conform to spacial requirements of varying utilization devices.

Other means for minimizing the internal resistance of supercapacitor structures have, for example, attempted to combine pyrolyzed aerogel, carbon foam electrodes with hightemperature soldering of conductive collector elements, as described in U.S. Pat. No. 5,260,855. Such approaches have realized limited success, however, due to the extensive processing and high energy and time consumption required, in addition to the lack of manipulability of the resulting devices.

Overcoming the limitations of prior supercapacitor structures and fabrication procedures, the present invention provides, in particular, means for readily preparing flexible, low resistance supercapacitor structures under economical ambient conditions. Such simple fabrication procedures enable the expanded use of these devices in a wide variety of configurations and applications, including combinations with integrated rechargeable battery energy sources of compatible composition and structure.

SUMMARY OF THE INVENTION

The supercapacitor structures and fabrication procedures of the present invention utilize in significant measure materials and techniques which have been successful in the preparation of polymeric rechargeable batteries, notably Li-ion batteries shown in such U.S. Pat. Nos. as 5,296,318, 5,418,091, 5,456,000, 5,571,634, and 5,587,253, the detailed descriptions of which are incorporated herein by reference.

Accordingly, supercapacitor devices having low internal resistance and being capable of yielding high energy and high current density over considerable time periods may be conveniently fabricated by lamination of electrode and separator films prepared from polymeric compositions comprising activated carbon and ion-conductive electrolyte.

Supercapacitor cell electrode and separator elements according to the present invention may utilize any of a wide variety of polymeric materials, e.g., poly(vinylidene fluoride-co-hexafluoropropylene) (VdF:HFP) and poly(vinylidene fluoride-co-chlorotrifluoroethylene) (VdF:CTFE) copolymers. Such elements preferably comprise a combination of a VdF:HFP copolymer matrix with 20 to 70% by weight of a compatible organic plasticizer which maintains a homogeneous composition in the form of a flexible, self-supporting film. The copolymer preferably comprises about 75 to 92% by weight vinylidene fluoride (VdF) and 2 to 25% hexafluoropropylene (HFP), a range in which the latter co-monomer limits the crystallinity of the final copolymer to a degree which ensures good film strength while enabling the retention of about 40 to 60% of preferred solvents for electrolyte salts. Within this range of solvent content, the 5 to 10% salt ultimately comprising a hybrid electrolyte membrane yields an effective room temperature ionic conductivity of about $10^{-4}$ to $10^{-3}$ S/cm, yet the membrane exhibits no evidence of solvent exudation which might lead to cell leakage or loss of conductivity.

Supercapacitor cells are constructed according to the invention by means of the lamination of electrode and separator cell elements which are individually prepared, by coating, extrusion, or otherwise, from compositions comprising a polymeric matrix of such a material as the noted polyvinylidene fluoride (PVdF) copolymers. For example, in the construction of such a supercapacitor cell an electrode film or membrane is prepared as a cast layer of a composition of activated carbon powder dispersed in a plasticized copolymer matrix solution which is dried to form the membrane. Sections of desired dimension are cut from the membrane and thermally laminated to respective electrically-conductive current collector foils, e.g., copper and aluminum reticulated grids, to form negative and positive capacitor electrodes. The copolymer matrix solution is similarly employed to prepare a separator membrane from which appropriately-sized sections are taken to interlay electrode pairs in an assembly which is then heated under pressure to thereby effect lamination of the cell elements into a unitary flexible supercapacitor structure.

At this stage the laminated structure comprises a significant measure of homogeneously distributed organic plasticizer which is then substantially removed by immersion of the cell laminate in a copolymer-inert solvent, such as diethyl ether or hexane, to selectively extract the plasticizer without significantly affecting the copolymer matrix of the cell element strata. The extracting solvent may then simply be evaporated to yield a dry, microporous supercapacitor cell which is thereafter activated by immersion or other contact with an electrolyte solution, e.g., 1M $LiPF_6$ in 2 parts ethylene carbonate and 1 part dimethyl carbonate, which fills the pores of the structure to ensure essential ionic conductivity.

The same fabrication procedure may be employed to form a supercapacitor structure having a pair of similar electrodes arranged on respective sides of a common electrode of opposite polarity. The result of this arrangement is a bicell supercapacitor having less weight than an equivalent parallel pair of single devices and thus providing greater specific energy density. A variant arrangement comprising a pair of opposite polarity single cell structures interfaced with a bimetallic current collector yields an equivalent series supercapacitor capable of providing twice the single cell voltage in one unitary device.

A particularly useful implementation of the present invention takes advantage of the compatibilities of materials and structure between the laminate supercapacitor and available polymeric laminate rechargeable battery cells mentioned above and provides a single unitary device comprising an economical and reliable source of both high energy and high power to meet the wide range of demands presented by modern electronic systems.

BRIEF DESCRIPTION OF THE DRAWING

The present invention will be described with reference to the accompanying drawing of which.

DESCRIPTION OF THE INVENTION

Figure 1:
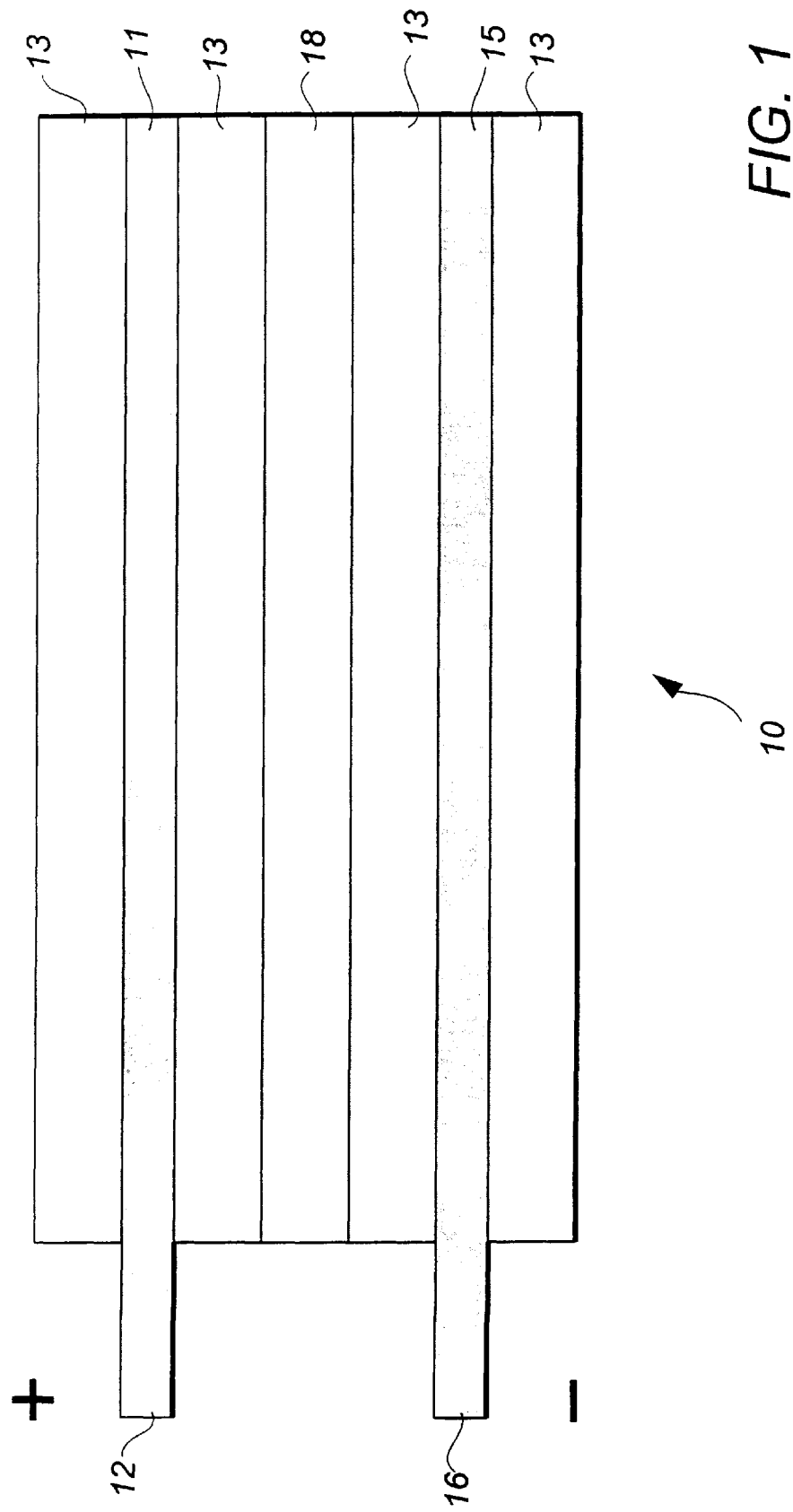
FIG. 1 is a diagrammatic representation in cross-section of a laminated single supercapacitor cell structure of the present invention.

A laminated supercapacitor structure of the present invention as depicted in FIG. 1 includes a positive electrode member comprising a current collector foil 11, preferably in the form of an open mesh aluminum grid, which is laminated under heat and pressure between a pair of electrode membranes 13, 13 comprising an activated carbon powder dispersed in a plasticized polymeric binder matrix. A negative electrode member similarly comprises a current collector foil 15, preferably in the form of a open mesh copper grid, which is laminated between another pair of activated carbon electrode membranes 13, 13. A separator member comprising a membrane 18 of plasticized copolymer composition is positioned between the composite electrode members, and heat and pressure are applied to soften and bond the polymeric components and laminate the electrode and separator members. Extensions 12, 16 of the respective current collector foils conveniently provide connection terminals for the supercapacitor device.

Separator membrane 18 is preferably prepared from a composition comprising an earlier-noted PVdF:HFP copolymer (available commercially from Atochem North America as Kynar FLEX) and a compatible organic plasticizer. Such a copolymer composition is also preferred for the preparation of the electrode membrane elements, since subsequent laminate interface compatibility is ensured. The plasticizer is preferably a high-boiling polymer solvent, such as dibutyl phthalate, dimethyl phthalate, diethyl phthalate, or tris butoxyethyl phosphate. Inorganic filler adjuncts, such as fumed alumina or silanized fumed silica, may be used to enhance the physical strength and melt viscosity of a separator membrane and, in some compositions, to increase the subsequent level of electrolyte solution absorption.

Electrode membrane elements 13, 13 are similarly prepared from a plasticized composition comprising the preferred copolymer material in which is dispersed an activated carbon powder of the type commercially employed in supercapacitor fabrication. Any common procedure for casting or forming films or membranes of polymer compositions may be employed in the preparation of the present membrane materials. Where casting or coating of a fluid composition is used, e.g., with meter bar or doctor blade apparatus, the viscosity of the composition will normally be reduced by the addition of a readily evaporated casting solvent, such as tetrahydrofuran (THF), acetone, or the like. Such coatings are normally air-dried at moderate temperature to yield self-supporting films of homogeneous, plasticized copolymer compositions. A membrane material, particularly for use as a separator element, may also be formed by allowing the copolymer in commercial form, i.e., bead or powder, to swell in a proportionate amount of plasticizer and then pressing the swollen mass between heated (e.g., about 130° C.) plates or rollers, or extruding the mixture.

Unlike earlier supercapacitor structures which relied upon highly-compressive device arrangements to maintain the essential intimate contact between respective electrode members and conductive current collector foil elements, the lamination of the present cell members alone ensures such intimacy and resulting low resistance electrical continuity, and provides ultimate supercapacitor cell integrity and flexibility. As an aid to ensuring such integral lamination, as well as low interface resistance, the collector elements may be pre-treated such as with an electrode-compatible polymeric material, for example, by application of a 0.25% to 2.5% solution of a copolymer similar to that of the electrode matrix, typically PVdF with 2 to 25% HFP, and heating at 250° to 450° C. for about 5 to 50 seconds prior to lamination. A somewhat heavier layer of the copolymer alone, e.g., that obtained by dipping in a 3% solution of the pretreatment polymer, provides excellent adhesion without a post-heating operation.

As with the membrane-forming operations, lamination of assembled supercapacitor cell structures may be accomplished with commonly-used apparatus. Preshaped or sized assemblies may be compressed between heated rollers or may simply be pressed for a short while between metal plates weighted at about $3 \times 10^4$ to $5 \times 10^4$ Pa in an oven at a temperature of about 120° to 160° C. or in a heated press providing similar conditions. Where continuous webs of component membranes are employed, the operation is preferably carried out using heated calender rollers.

The final operation in the supercapacitor cell fabrication process entails activation of the cell which comprises replacement of the copolymer plasticizer with an electrolyte in order to achieve ionic conductivity. Such replacement is preferably accomplished through application of an electrolyte solution after extraction of the plasticizer from the copolymer composition of the structure by immersing the laminated cell structure, e.g., that of FIG. 1, in a solvent for the plasticizer which has significantly little affect on the copolymer matrix material. For the preferred PVdF copolymers, such a solvent may be diethyl- or dimethyl ether, methanol, hexane, and the like. The microporous matrix structure formed by moderately slow evaporation of the extraction solvent provides throughout the matrix an abundance of sites for retention of one or more of the non-aqueous electrolyte solutions commonly employed in supercapacitors.

A number of laminated supercapacitor cells such as depicted in the FIGs. were prepared with compositions comprising VdF:HFP copolymers and were tested for electrical and physical suitability of use. The following examples are illustrative of such preparation and use.

EXAMPLE 1

An electrode coating composition was prepared by suspending 10 g of a high surface area (1000 $m^2/g$) activated carbon powder in a solution of 20 g of an 88:12 VdF:HFP copolymer of about $380 \times 10^3$ MW (Atochem Kynar FLEX 2801) and 30 g of dibutyl phthalate (DBP) in about 160 g of acetone. The mixture was stirred in a mechanical blender for about 10 minutes to ensure homogeneity and was then cast upon an abherent polyethylene terephthalate surface with a doctor-blade device and allowed to dry in air at room temperature for about 1 hour. The resulting dry, tough, flexible membrane of about 0.125 mm thickness was readily removed from the coating surface and was divided into samples of about 50 mm×80 mm to be used as supercapacitor electrode elements.

An aluminum open mesh grid of about 50 $\mu$m thickness, e.g., a MicroGrid precision expanded foil marketed by Delker Corporation, was cut to form a current collector element 11 (FIG. 1) of about 50 mm×100 mm. One of the polymer composition membrane samples was arranged in contact with each surface of collector 11 to form electrode elements 13, 13 and provide an extending collector terminal tab 12. This assemblage was passed between rollers heated to about 125° C. at a pressure of about 45 N per linear cm of roller contact where the polymeric electrode composition of membranes 13, 13 softened sufficiently to penetrate the open mesh of the grid collector 11 and establish a coherent bond which firmly embedded the collector to form a unitary positive electrode member.

A negative electrode member was similarly formed employing a pair of the electrode membranes 13, 13 and a copper grid collector foil 15 having a terminal tab 16.

A separator membrane coating composition was prepared in the previous manner as a suspension of 4 g of fumed silica in a solution of 6 g of the Kynar FLEX 2801 VdF:HFP copolymer and, 10 g of DBP in about 40 g of acetone. After blending, the mixture was cast and dried to a tough, flexible membrane of about 0.075 mm thickness which was divided into samples of about 50 mm×80 mm. One sample 18 of the separator membrane was arranged between the previously-prepared positive and negative electrode members and the assemblage was laminated in the manner of the individual electrode members to form a flexible, unitary single supercapacitor structure 10.

Laminated cell structure 10 was thereafter immersed in a body of diethyl ether where, under mild agitation for about 10 minutes, the DBP component of the electrode and separator membrane compositions was extracted. Structure 10 was then removed from the extracting bath and air-dried at room temperature. Finally, the cell was activated under a moisture-free atmosphere by immersion in a 1 M electrolyte solution of LiPF6 in a 2:1 mixture of ethylene carbonate (EC):dimethyl carbonate (DMC) for about 10 minutes during which it imbibed the electrolyte solution into the microporous laminate structure to substantially replace the original DBP plasticizer. Following a mild wiping with absorbent material to remove surface electrolyte, the activated supercapacitor cell 10 was hermetically sealed, but for the extending terminal tabs 12, 16, within a polyolefin envelope (not shown) to maintain a moisture-free environment.

Figure 5:
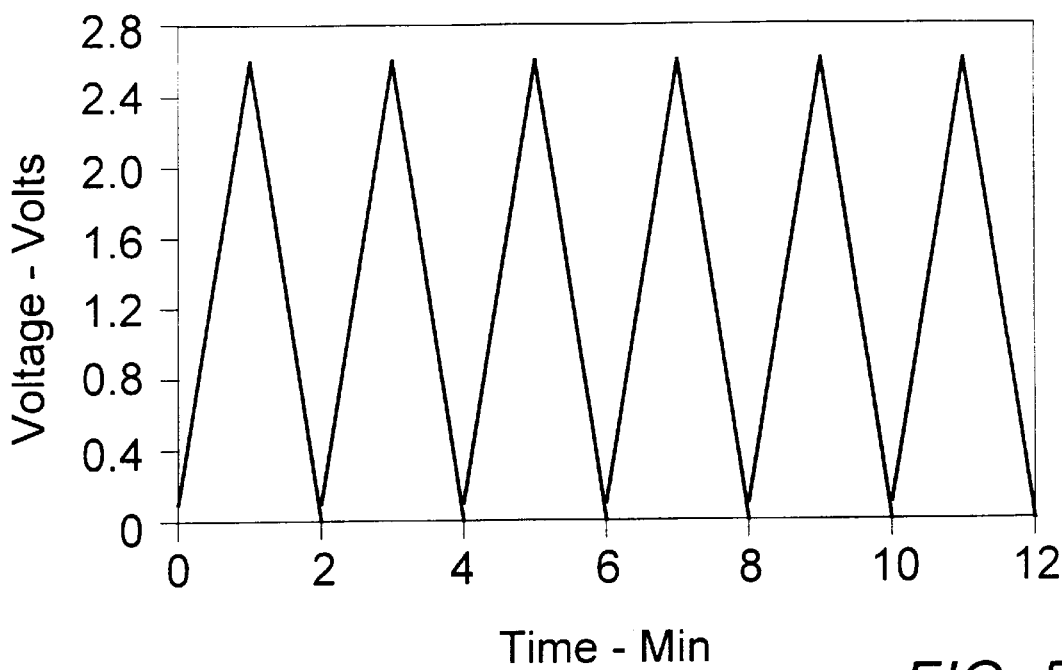
FIG. 5 is a graphical representation of the charge/discharge characteristics of a supercapacitor of the present invention.
Figure 6:
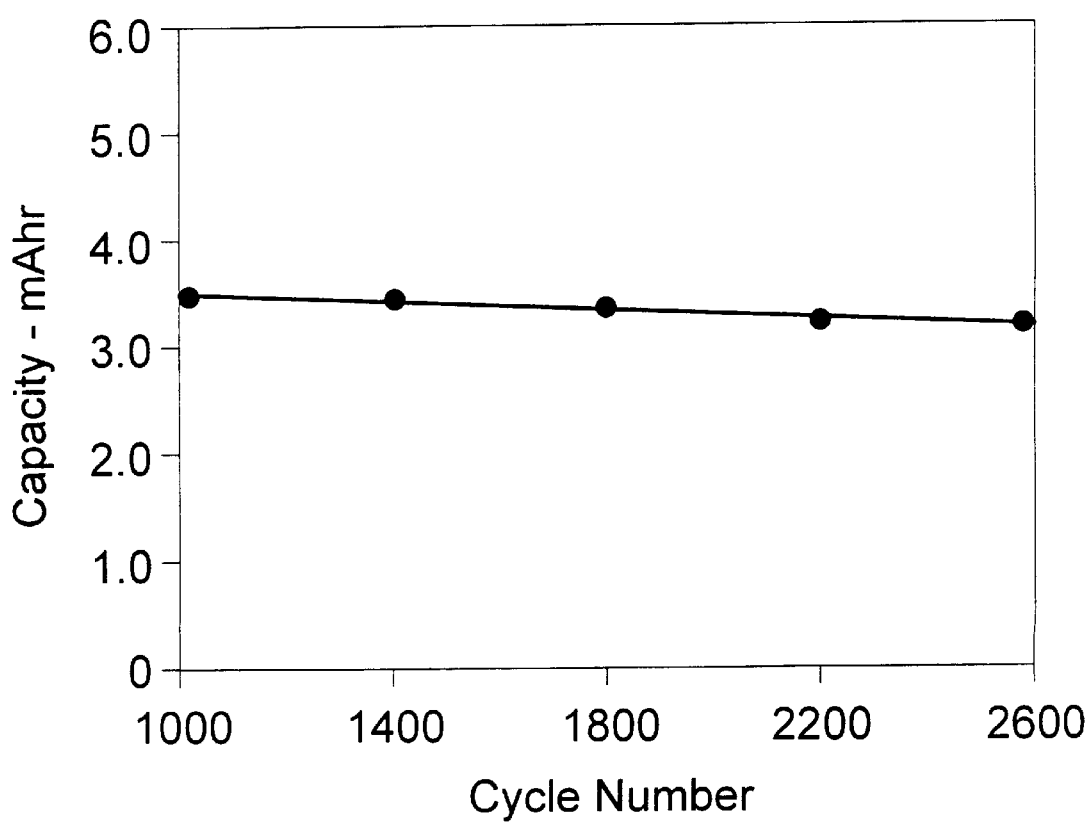
FIG. 6 is a graphical representation of the cycling stability if a supercapacitor of the present invention.

The supercapacitor cell, which exhibited a capacitance of about 19.2 F, was then subjected to repeated charge/discharge cycling of 2 min periods in the range of 0–2.5 V and exhibited the cycling characteristics represented in FIG. 5. The capacity of the supercapacitor after extended such cycling remained at about 3.5 mAhr as shown in FIG. 6.

EXAMPLE 2

Figure 2:
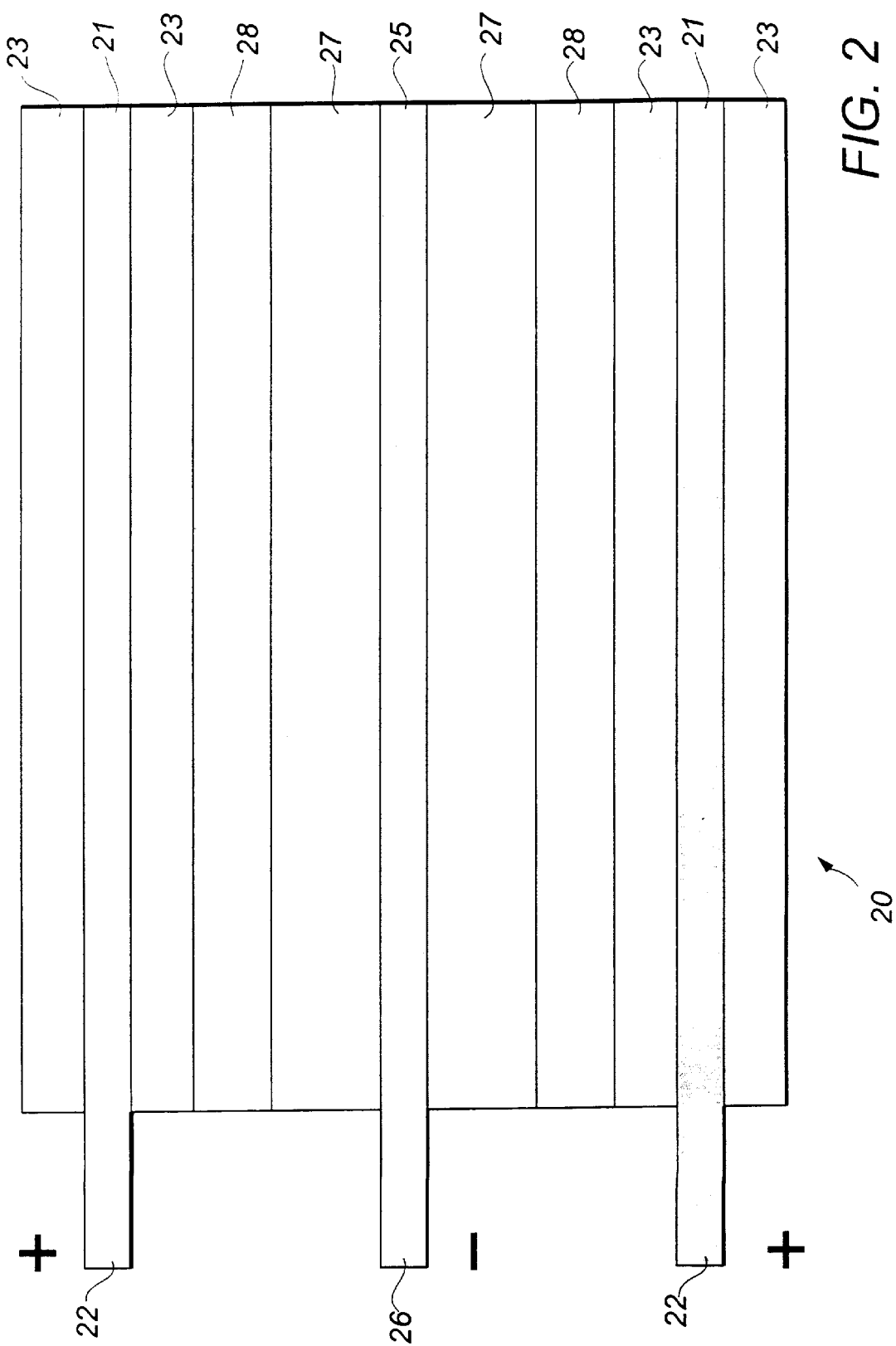
FIG. 2 is a diagrammatic representation in cross-section of a laminated double parallel supercapacitor cell structure of the present invention.

A supercapacitor bicell 20 capable of achieving significantly greater specific energy density was prepared as depicted in FIG. 2. A pair of positive electrode members were fabricated as in Example 1 by lamination of collector grids 21 having extensions 22 and carbon electrode membranes 23. Additional electrode membranes 27, 27 of substantially twice the thickness were prepared using the electrode composition of Example 1 and were laminated in the previous manner with negative copper grid element 25 having extension 26 to form a single negative electrode. This electrode member was arranged, as the common negative electrode, between two separator membranes 28, 28 and the pair of positive electrodes as shown in FIG. 2, and the assemblage was laminated as before to form the bicell supercapacitor structure 20. In this manner, the superfluous weight of one current collector member is eliminated to thereby reduce the overall mass of the cell. The resulting structure was extracted and activated with electrolyte solution as described in Example 1 to yield a functional supercapacitor capable of achieving greater specific energy density.

EXAMPLE 3

Figure 3:
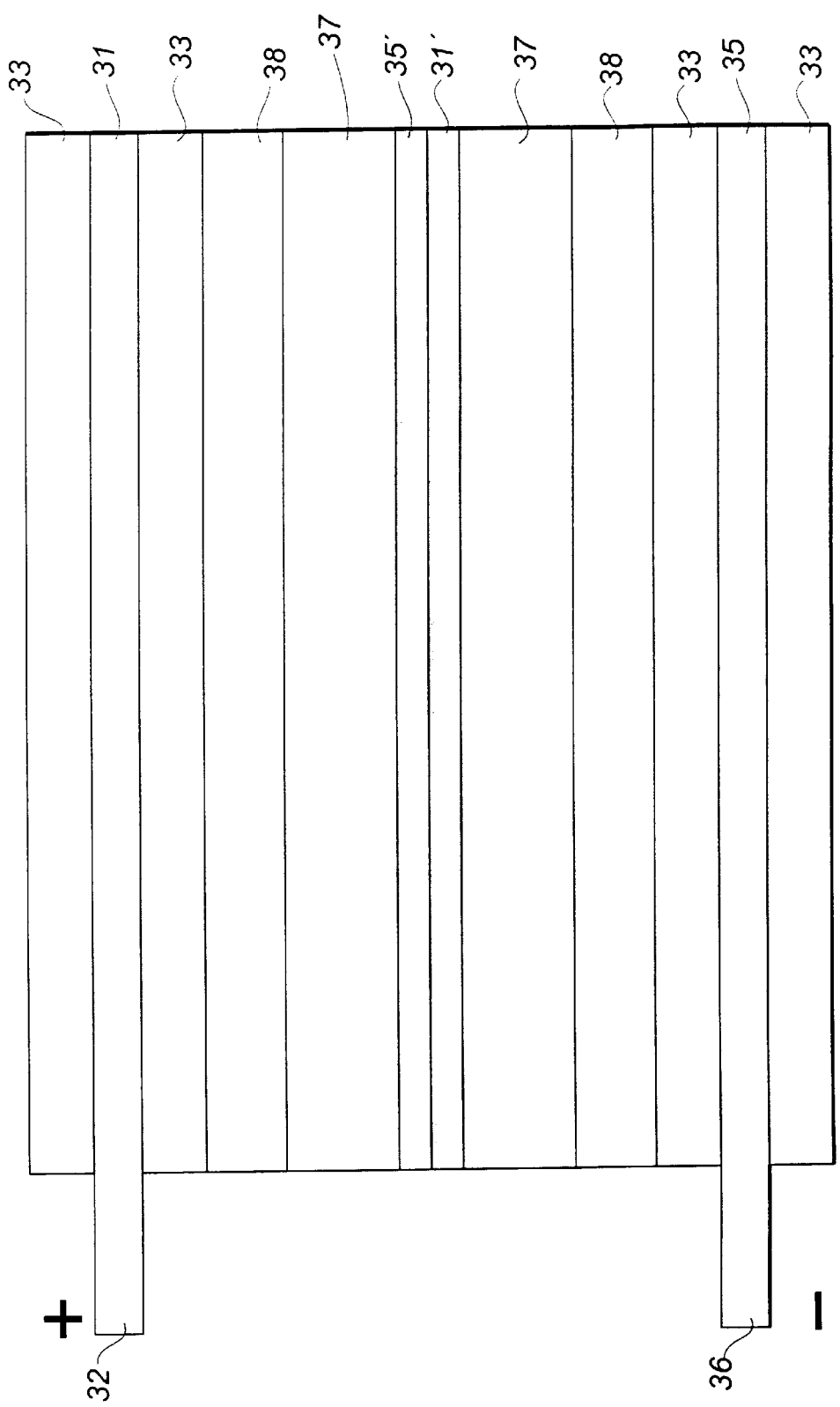
FIG. 3 is a diagrammatic representation in cross-section of a laminated double series supercapacitor cell structure of the present invention.

Another embodiment of the present invention is depicted in FIG. 3 and comprises a bipolar supercapacitor structure 30 which is capable of providing a doubling of the voltage achieved by a single cell supercapacitor. In fabricating this structure each of a positive aluminum collector grid 31 having extension 32 and negative copper collector grid 35 having extension 36 were laminated between carbon electrode membranes 33 prepared as in Example 1 to yield positive and negative electrodes. In addition, a single bipolar electrode was prepared by laminating double-thickness carbon electrode membranes 37, 37 of Example 2 to a solid bimetal foil presenting respective aluminum 31' and copper 35' surfaces. The positive, negative, and bipolar electrodes were then laminated with interposed separator membranes 38, 38 to form the supercapacitor capable, after extraction/activation, of providing a two cell series equivalent in a single structure.

EXAMPLE 4

Figure 4:
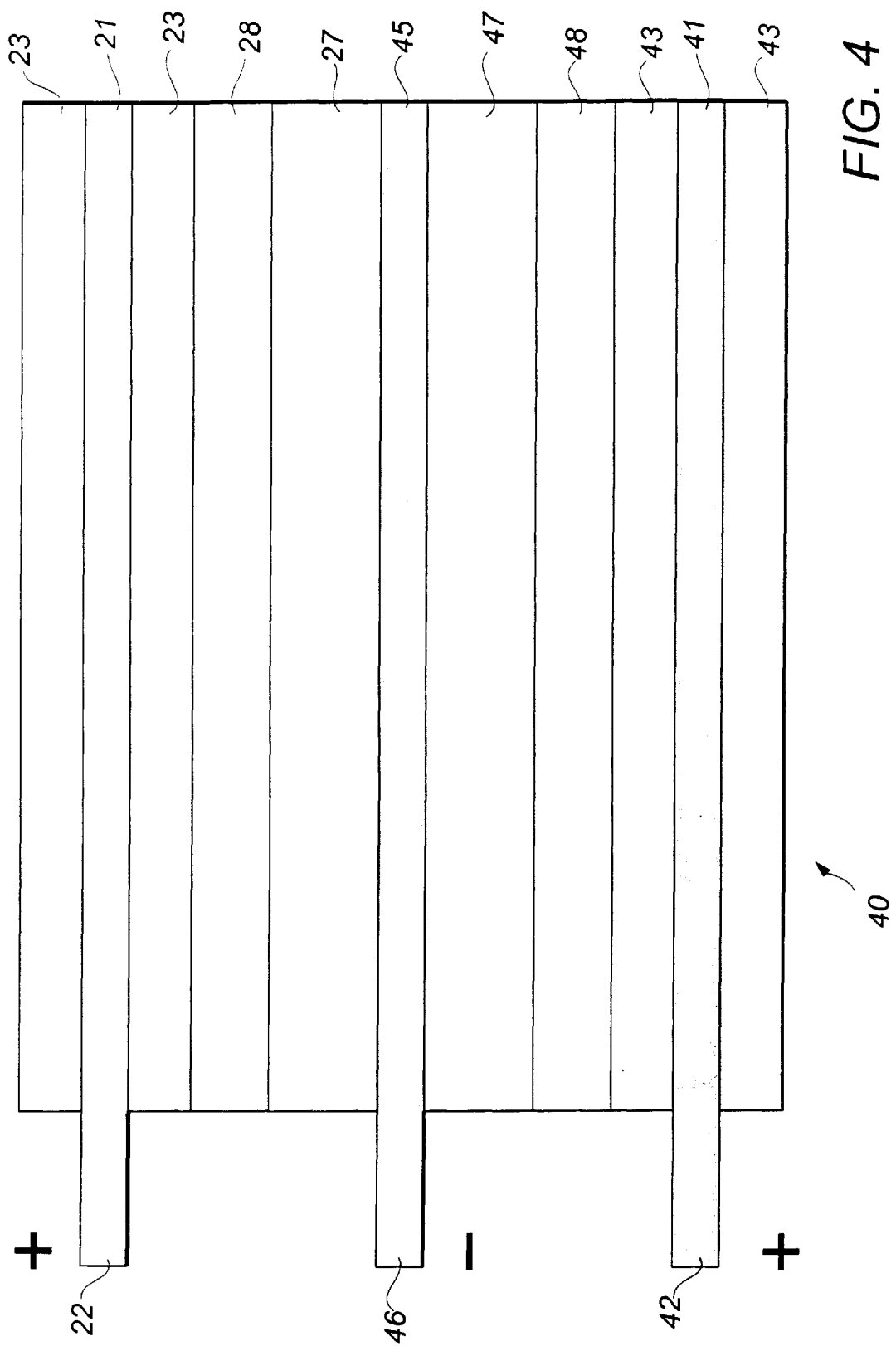
FIG. 4 is a diagrammatic representation in cross-section of a laminated hybrid electrochemical battery/supercapacitor cell structure of the present invention.

The convenience and versatility of the present supercapacitor structure is particularly apparent in the hybrid cell shown in FIG. 4 where a single supercapacitor cell structure 40, as depicted in part in FIG. 2, is laminated with a polymeric Li-ion battery cell to yield a structure capable of providing both high energy density and high power as required in many utilization devices. In addition to the laminated supercapacitor structure comprising positive collector 21 having extension 22, positive electrode membranes 23, 23, negative electrode membrane 27, and separator membrane 28, as described in Example 2, the hybrid structure comprises positive aluminum grid current collector 41 having extension 42 with laminated positive battery electrode membranes 43, 43, separator/electrolyte membrane 48, negative battery electrode membrane 47, and a common supercapacitor/battery negative copper current collector foil 45 having extension 46.

The battery electrode membranes may comprise any of the polymeric compositions described in the above-mentioned references. For purposes of the present example, a typical positive intercalation electrode composition was employed which comprised a suspension of 10.5 g of $Li_{1.05}Mn_2O_4$, 2.8 g of the VdF:HFP copolymer of Example 1, 4.3 g of DBP, 1.2 g of Super-P conductive carbon powder, and about 20 g of acetone. The negative battery electrode composition was prepared as a suspension of 7.0 g of pulverized (<60 µm) commercial petroleum coke, 2.0 g of the VdF:HFP copolymer, 3.12 g of DBP, 0.37 g of Super-P carbon, and about 12 g of acetone. These compositions were cast to form electrode membranes as in the previous examples. Battery cell separator 48 was formed of separator membrane prepared in Example 1. The final lamination, extraction, activation, and packaging operations were carried out in the manner described in Example 1.

The supercapacitor structures of the present invention may be successfully activated with any of the numerous compositions used as liquid electrolyte solutions. Notably, there may be employed in the electrolyte solution such organic solvents as propylene carbonate, diethoxyethane, diethyl carbonate, dimethoxyethane, sulfolane, and dipropyl carbonate and mixtures thereof. Also, in the formulation of the activating electrolyte solutions, further useful lithium and other salts, including $LiClO_4$, $LiN(CF_3SO_2)_2$, $LiBF_4$, $LiCF_3SO_3$, $LiSbF_6$, $NBu_4BF_4$, and $Et_4NBF_4$ may be employed in solution concentrations of between about 0.5 and 2 M. Of particular utility are the exceptional ethylene carbonate/dimethyl carbonate compositions of $LiPF_6$ and mixtures with $LiBF_4$ described in U.S. Pat. No. 5,192,629.

While the above examples have related in large measure the preparation of a number of useful supercapacitor structures, other variants are likewise to be included within the scope of the invention as set out in the appended claims.

What is claimed is:

1. A method of making a supercapacitor structure comprising provided a positive electrode member formed as a flexible membrane of polymeric matrix composition having an activated carbon powder uniformly distributed therein bonded to an electrically-conductive current collector element;

providing a negative electrode member formed as a flexible membrane of polymeric matrix composition having an activated carbon powder uniformly distributed therein bonded to an electrically-conductive current collector element;

providing a separator member formed as a flexible membrane of polymeric matrix composition;

arranging contiguously said separator member between said positive electrode member and said negative electrode member; and bonding said separator member to said positive electrode member and to said negative electrode member to form a unitary flexible laminate structure.

2. A method according to claim 1 wherein said step of bonding comprises heating said contiguous members under pressure to soften the respective polymeric matrix compositions and effect a cohesive laminate bond between said members.

3. A method according to claim 1 wherein the polymeric matrix membrane of each of said positive electrode member, said negative electrode member and said separator is formed of a polymer composition having homogeneously distributed therein 20 to 70% by weight of an organic plasticizer compatible with said polymer; and said method further includes the steps of removing substantially all of said plasticizer from said laminate structure with a polymer-inert solvent; and replacing with an electrolyte solution the plasticizer so removed.

* * * * *